United States Patent [19]

Göckelmann

[11] Patent Number: 5,115,730
[45] Date of Patent: May 26, 1992

[54] COFFEE MACHINE

[75] Inventor: Karl Göckelmann, Gerstetten, Fed. Rep. of Germany

[73] Assignee: WMF Wurttembergische Metallwarenfabrik Aktiengesellschaft, Fed. Rep. of Germany

[21] Appl. No.: 505,669

[22] Filed: Apr. 3, 1990

[30] Foreign Application Priority Data

Apr. 6, 1989 [DE] Fed. Rep. of Germany ....... 3911169

[51] Int. Cl.⁵ ............................................. A47J 31/04
[52] U.S. Cl. ........................................ 99/280; 99/293; 99/300; 99/305
[58] Field of Search ................. 99/279, 280, 300, 293, 99/302 FB, 302 C, 302 P, 302 R, 295, 299, 305

[56] References Cited

U.S. PATENT DOCUMENTS

| | | | |
|---|---|---|---|
| 4,083,295 | 4/1978 | Hollingsworth | 99/293 |
| 4,151,790 | 5/1979 | Spirk | 99/305 |
| 4,204,465 | 5/1980 | Knecht | 99/293 |
| 4,575,615 | 3/1986 | Shigenobu et al. | 99/279 |
| 4,714,011 | 12/1987 | Ly | 99/279 |
| 4,725,714 | 2/1988 | Naya et al. | 99/282 |
| 4,757,752 | 7/1988 | Robins et al. | 99/279 |
| 4,757,753 | 7/1988 | Pandolfi | 99/293 |
| 4,871,089 | 10/1989 | Rader et al. | 99/280 |

FOREIGN PATENT DOCUMENTS

| | | |
|---|---|---|
| 188457 | 1/1957 | Austria . |
| 2622425 | 12/1977 | Fed. Rep. of Germany ........ 99/279 |
| 8625346 | 2/1987 | Fed. Rep. of Germany . |

Primary Examiner—Harvey C. Hornsby
Assistant Examiner—James F. Hook
Attorney, Agent, or Firm—Finnegan, Henderson, Farabow, Garrett & Dunner

[57] ABSTRACT

A coffee machine having a flow heater in the hot water line that effects additional heating of a residual amount of hot water left in the line after termination of the coffee-making process to convert it to steam and press out any water remaining in the used grounds to dry them for easy removal.

6 Claims, 2 Drawing Sheets

COFFEE MACHINE

The present invention relates to a coffee machine.

Such a coffee machine is known from Austrian-pat. 188 457. The known machine is used for preparing espresso, and, for this purpose, it includes, in addition to the water heating means for the coffee-making water, a steam generating means, which is provided with an outlet nozzle and which is adapted to be used for emitting a froth-producing jet of steam into the cup which has already been filled with coffee or into a vessel filled with milk etc. In the case of the known espresso machine, this additional steam generating means is also used for the purpose of directing a jet of steam through the coffee-grounds so as to dry said coffee-grounds when the cup has been filled with the predetermined amount of coffee and when a shut-off valve stopping the supply of hot water has been closed. It follows that the drying device of the known espresso machine requires a steam generating means, which, however, is only economical if it can also be used for other purposes, e.g. for the purpose of frothing.

The essentially complete removal of the exhausted coffee-grounds from the coffee-making chamber is a general problem in the case of coffee machines. In cases in which fixedly installed coffee machines can be connected to a channel system, the exhausted coffee-grounds can be flushed by an additional gush of hot or cold water (wet flushing). If a connection to a channel system is not possible or not desired, the coffee-grounds have to be removed by some type of mechanical arrangement. The coffee-making chamber can, for example, be removed and the coffee-grounds poured out by turning the coffee-making chamber upside-down. It is also possible to strip the coffee-grounds by stripping means, which can be operated automatically or manually. In all these cases, it must, however, be guaranteed that the smallest possible amount of exhausted coffee-grounds remain in the coffee-making chamber. This can be accomplished more easily when an increase in the degree of dryness of the coffee-grounds is achieved. Hence, there have been many attempts to dry the exhausted coffee-grounds as far as possible.

In the case of a previously used coffee machine, an overpressure is produced during the coffee-making process on the basis of the structural design of the coffee-making chamber due to the heating and, consequently, the expansion of the air contained in the coffee-making chamber. This overpressure has the effect that, when the hot water supply means has been blocked, the residual amount of coffee-making water is pressed through the coffee-grounds, whereby the coffee-grounds are dried. It is, however, very difficult to adjust the correct size of the air cushion in the coffee-making chamber. If an excessive amount of air is contained in the coffee-making chamber, a good overpressure will be achieved, but an excessively long period of time will be necessary for effecting pressure compensation so that the periods of time between the individual coffee-making processes become too long. If the air cushion is too small, the period within which pressure compensation is effected will not be long enough and the coffee-grounds will not be dried completely.

Hence, the present invention is based on the object of further developing a coffee machine for making hot drinks by pouring boiling water on an aroma compound, in such a way that the exhausted aroma compound can be dried rapidly and completely in a structurally simple manner.

The embodiment according to the invention necessitates only the provision of an additional flow heater, which is connected in such a way that it overheats and vaporizes, respectively, a residual amount of the hot water used for coffee making, and dries the exhausted aroma compound thereby. It is neither necessary to provide an additional, pressure-tight steam vessel nor is it necessary to precisely adjust the size of the coffee-making chamber.

When a shut-off valve is used for controlling the supply of hot water, the residual amount of hot water is determined by the hot water remaining between the shut-off valve and the coffee-making chamber after the shut-off operation, said hot water being heated by the flow heater arranged at this location.

The retaining means provided in the flow heater is particularly expedient in cases in which no shut-off valve is used or in which the shut-off valve has to be arranged too far from the coffee-making chamber for structural reasons. With the aid of the retaining means a residual amount of hot water is determined in this case, too, and this residual amount of water can be heated by the flow heater for the purpose of drying the coffee-grounds.

Embodiments of the present invention will be explained in detail hereinbelow on the basis of the drawings, in which:

FIG. 1 shows part of a coffee machine only the features which are essential to the invention being shown. Each known type of coffee machine can be used.

Figure 1:
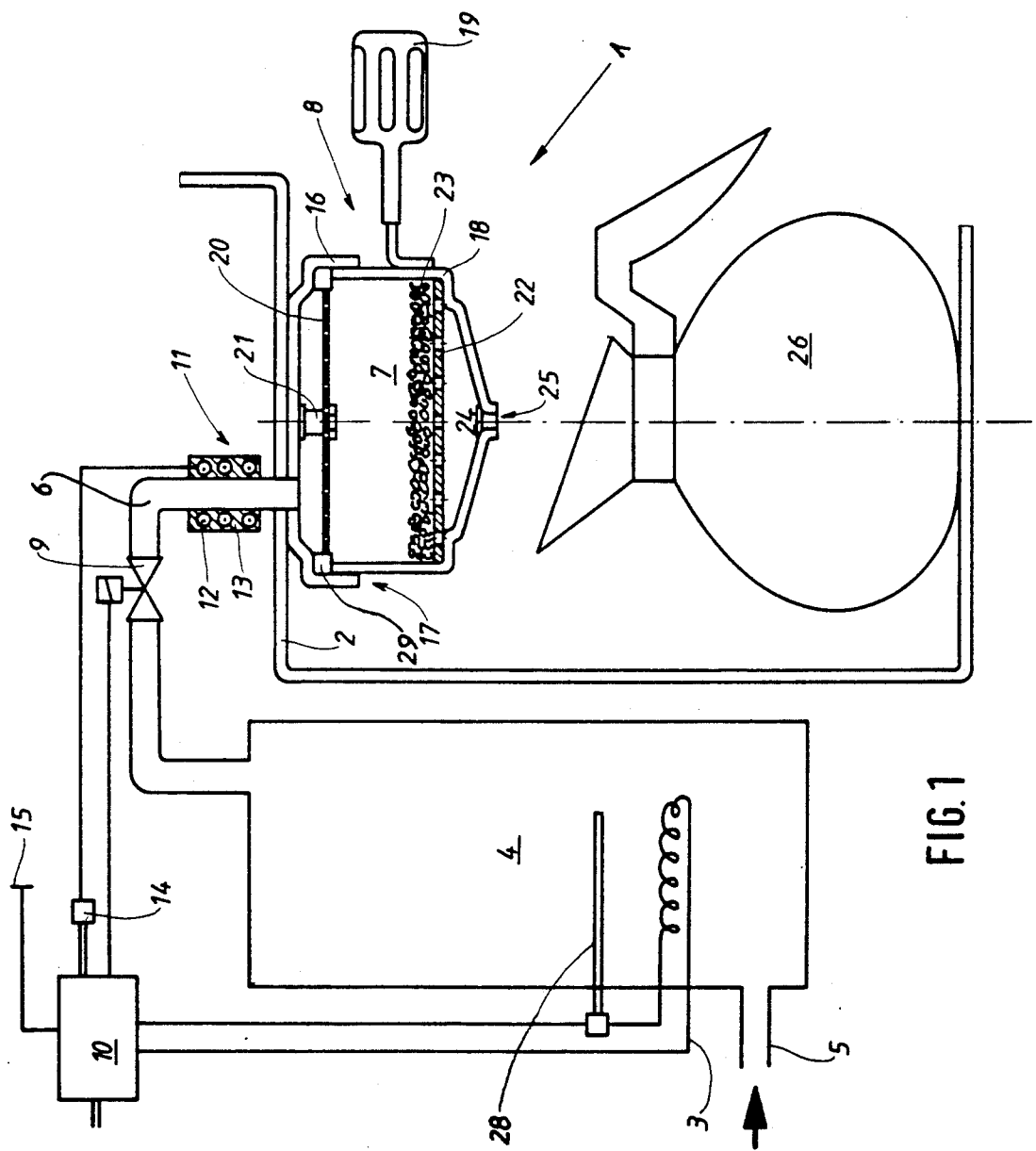
FIG. 1 is a schematic representation of the coffee-making means of a coffee machine of a first embodiment of the invention.

In the case of the embodiment shown, the coffee machine 1 is provided with a housing 2, only part of a boundary wall of said housing being shown in the drawing. The interior of said housing has arranged therein a water heating means in the form of a hot water vessel 4 provided with a heating device 3. The heating device 3 as well as a thermostat 28, which is arranged within the hot water vessel 4 as well, are controlled via a control means 10 in the manner known. A cold water conduit connection 5 for providing a connection to the water conduit opens into the hot water vessel 4. A hot water conduit 6 leads away from said hot water vessel 4, said hot water conduit 6 extending through the boundary wall 2 outwardly and ending in a coffee-making chamber 7 of a coffee-making means 8.

The hot water conduit 6 has provided therein a shut-off valve 9, which is connected to the control means 10. A flow heater 11 is provided after the shut-off valve 9 and a short distance from the point where the hot water conduit 6 ends in the coffee-making chamber 7, when seen in the direction of flow of the hot water. The flow heater 11 consists of an electric heating coil 12, which surrounds the hot water conduit 6 and which is accommodated within a housing 13. Heating coil 12 is also connected to the control means 10 via a switch 14. By means of an actuating button 15, which is arranged on the outside of the housing of the coffee machine 1, the control means 10 can be activated so as to initiate a coffee-making process.

The coffee-making means 8 is constructed as a case, which is closed in an essentially pressure-tight manner, and it includes a holding member 16 secured to the wall 2. The holding member 16 has releasably connected thereto a filter support 18 via a bayonet joint 17. Both parts are sealed relative to each other by means of a seal 29. A handle 19 is provided for releasing the filter support 18 from and for securing it to the holding member 16.

Holding member 16 has located therein a distributing sieve 20 for the coffee-making water, said distributing sieve 20 being held, by means of a spacer 21, at a predetermined vertical distance below the hot water conduit 6, which leads into said coffee-making means 8 from above and at right angles thereto. The filter support 18 contains a filter sieve 22 on which, as indicated in the drawing, a substantially uniform layer of coffee powder 23 is deposited. A collecting chamber 24 extends below the filter sieve 22, the walls of said collecting chamber 24 descending towards a centrally arranged discharge opening 25. A conventional vessel—the vessel shown in the drawing being a carafe 26—is placed below the discharge opening 25 so as to receive therein the coffee produced by the coffee-making process.

The coffee machine shown in FIG. 1 works as follows: prior to beginning a coffee-making process, the coffee powder 23 is filled into the filter support 18 by hand or by means of suitable metering devices, and it is distributed on the filter sieve 22 in a layer which is as uniform as possible. The filter support 18 is inserted into the holding member 16 from below and the bayonet joint 17 is closed by rotating the handle 19 in the horizontal direction. The carafe 26 is placed below the discharge opening 25 and a coffee-making process is initiated by actuating the actuating button 15. Said actuating button 15 activates the control means 10 and opens the shut-off valve 9. The hot water conduit 6 can have provided therein a flowmeter, which is not shown in the drawing. When the predetermined amount of hot coffee-making water from hot water vessel 4 has been apportioned or when a period of time corresponding to the period of flow of the predetermined amount of coffee-making water has elapsed, the shut-off valve 9 is closed. When the shut-off valve 9 is being closed, a residual amount of hot water is present between the shut-off valve 9 and the coffee-making chamber 7. This residual amount of hot water can only flow off slowly, since the pressure of the incoming hot water, which pressed the preceding coffee-making water through the coffee powder 23, is missing. As the shut-off valve 9 is being closed, the heating coil 12 of the flow heater 11 is switched on at the same time. By means of said heating coil 12, the residual amount of hot water in the hot water conduit 6 is heated above the optimum coffee-making temperature until it is converted into steam, which has the effect that an overpressure builds up in the hot water conduit 6 from the shut-off valve 9 to the coffee-making chamber 7. This overpressure presses the residual coffee-making water completely through the coffee powder 23 thus drying it. The control means 10 is programmed in such a way that it switches off the heating coil 12 of the flow heater 11 after an optimum drying period, which can be determined empirically. By rotating the handle 19, the filter support 18 can be detached from the holding member 16, whereupon it can be emptied into a used coffee-grounds receiving receptacle by knocking. The steam generated by heater 11 presses out all moisture from the coffee grounds so that, when the filter support is emptied by knocking, essentially the whole amount of dry coffee-grounds will fall out of the filter support and there will be no residual coffee-grounds which left may impair the quality of the coffee produced by a subsequent coffee-making process.

Figure 2:
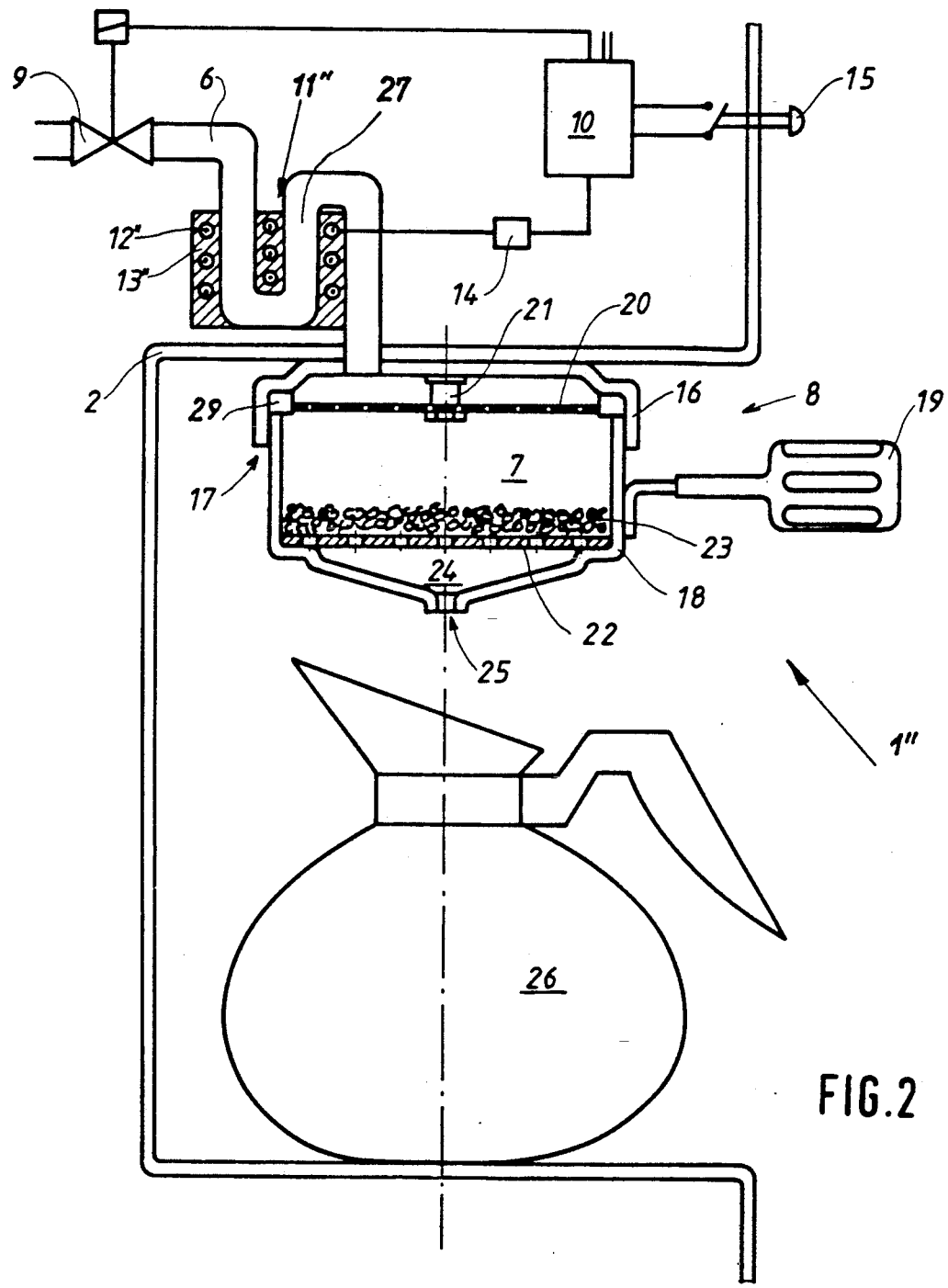
FIG. 2 shows an additional embodiment of the invention.

A modified embodiment of a coffee machine 1" is shown in FIG. 2. Components which are identical or comparable with components of the embodiment according to FIG. 1 are provided with the same reference numerals and are not explained. The coffee machine 1" is provided with a modified flow heater 11". The flow heater 11" includes a retaining means for a residual amount of hot water which is enough to dry the coffee-grounds, said retaining means being provided in the form of an upright, U-shaped knee-piece 27 in the hot water conduit 6. Also the knee-piece 27 is surrounded by an electric heating coil 12", which is accommodated in a housing 13". The flow heater 11" including the retaining knee piece 27 can be used wherever the hot water flows off comparatively rapidly after stopping the hot water supply so that the period of time may perhaps not be long enough for heating the residual amount to the drying temperature. This can, for example, be the case if the layer of coffee powder on the filter sieve 22 is comparatively thin. This can also be the case if it is, for example, difficult to build up an overpressure within the coffee-making chamber 7 or if, due to structural particularities (e.g. in the case of a higher pressure of the hot water in espresso machines), the hot water flows into the coffee-making chamber too fast. The mode of operation of the coffee machine 1" corresponds to that of the coffee machine 1 of FIG. 1, the only difference being that the residual amount of hot water is retained and additionally heated in the knee-piece 27.

As a modification of the embodiments which are shown and described hereinbefore, it is also possible to provide—instead of a hot water vessel—other water heating means, e.g. conventional flow heaters or steam generating means, which are provided, for example, in the case of espresso machines. The structural design according to the present invention can also be used in cases in which the coffee-making water is not heated in the machine itself, but is supplied from outside in a heated condition, e.g. from an external water heating means. The water conduit supplies hot water having a temperature of approx. 90° C. The additional flow heater is used for further heating the coffee-making water to the coffee-making temperature of e.g. 95° C. When a flowmeter registers that the desired amount of water has flown through, the inlet valve switches off. The residual amount of water, which stands in the pipe of the hot water conduit, is converted into steam by the flow heater, which is still heated, and presses the water through the coffee-making means. The flowmeter can be arranged directly in front of the shut-off valve as well as on the cold water side at the conduit connection. The shut-off valve need not necessarily be provided in the hot water conduit, but it can, for example, also be provided in the cold water supply means. Other types of flow heaters, which are adapted to be actuated and deactuated, can be provided. It is also possible to provide a flow heater on the coffee-making chamber. Finally, the control can also be effected completely by hand or in a fully automatic manner.

I claim:

1. In a hot drink making machine for making predetermined quantities of hot drinks by pouring hot water over an aroma compound in a hot drink making chamber wherein said water is heated to a temperature suitable for making said hot drinks, said machine including a hot water conduit connecting a source of hot water, to the chamber in which the hot water flows in the conduit from the hot water source to the chamber, and a shut-off valve adapted to be closed to stop the flow of water to the chamber after a predetermined quantity of water corresponding to the predetermined quantity of hot drink to be made has passed the valve, the improvement comprising locating said shut-off valve in said conduit downstream of the hot water source and including a flow heater separate and apart from the hot water source and downstream of the shut-off valve in the flowing direction of the hot water for heating residual hot water left in the conduit after the valve has been closed and control means for closing said valve and for activating said flow heater upon completion of a hot drink making cycle to convert said residual water to steam for drying the aroma compound in said chamber that has been exhausted by the hot drink making process.

2. The hot drink making machine of claim 1, wherein the flow heater is located in the hot water conduit between the shut-off valve and said chamber.

3. The hot drink making machine of claim 2, wherein the flow heater is an electric heating coil that surrounds the hot water conduit.

4. The hot drink making machine of claim 2, wherein the flow heater is located upstream in the flowing direction from and adjacent to the point where the hot water conduit connects with said chamber.

5. The hot drink making machine according to one of claims 1 to 4, wherein the flow heater includes a retaining means for holding the residual hot water left in the conduit after the shut-off valve has been closed.

6. The hot drink making machine of claim 5, wherein the retaining means comprises a U-shaped section in the hot water conduit between the shut-off valve and the chamber and the flow heater comprises an electric heating coil that surrounds said U-shaped section of the conduit.

* * * * *